United States Patent
Li et al.

(10) Patent No.: US 8,984,909 B2
(45) Date of Patent: Mar. 24, 2015

(54) METHOD FOR SEALING PUMP-OUT HOLE OF VACUUM GLASS, SEALING STRUCTURE AND SEALING DEVICE

(75) Inventors: Yanbing Li, Henan (CN); Zhangsheng Wang, Henan (CN)

(73) Assignee: Luoyang Landglass Technology Co., Ltd, Henan (CN)

( * ) Notice: Subject to any disclaimer, the term of this patent is extended or adjusted under 35 U.S.C. 154(b) by 353 days.

(21) Appl. No.: 13/511,777

(22) PCT Filed: Nov. 1, 2010

(86) PCT No.: PCT/CN2010/078278
§ 371 (c)(1),
(2), (4) Date: Aug. 1, 2012

(87) PCT Pub. No.: WO2011/063701
PCT Pub. Date: Jun. 3, 2011

(65) Prior Publication Data
US 2012/0285199 A1    Nov. 15, 2012

(30) Foreign Application Priority Data
Nov. 27, 2009    (CN) .......................... 2009 1 0250137

(51) Int. Cl.
*C03C 27/08* (2006.01)
*B23K 1/00* (2006.01)
*E06B 3/663* (2006.01)
*E06B 3/673* (2006.01)

(52) U.S. Cl.
CPC .............. *C03C 27/08* (2013.01); *B23K 1/0008* (2013.01); *E06B 3/66304* (2013.01); *E06B 3/66357* (2013.01); *E06B 3/67334* (2013.01); *E06B 3/67326* (2013.01)
USPC ............................................................ 65/34

(58) Field of Classification Search
CPC ............................. C03C 27/08; B23K 1/0008
USPC ............ 65/34, 59.24, 59.25, 59.31, 59.4, 154
See application file for complete search history.

(56) References Cited

U.S. PATENT DOCUMENTS 7,204,102 B1    4/2007 Eames et al.
2002/0121111 A1*    9/2002 Yoshizawa et al. ............... 65/34

FOREIGN PATENT DOCUMENTS

| CN | 1168708 A | 12/1997 |
| CN | 2275151 Y | 2/1998 |
| CN | 2539821 Y | 3/2003 |

* cited by examiner

*Primary Examiner* — Queenie Dehghan
(74) *Attorney, Agent, or Firm* — AKC Patents, LLC; Aliki K. Collins

(57) ABSTRACT

A method for sealing the pump-out hole of vacuum glass comprises: first preparing metal layer which is bonded with the glass plate at the outside surface of the glass plate around the pump-out hole; and air-tightly welding the sealing element and the metal layer around the pump-out hole by metal brazing technology after pumping. A structure and a device for sealing the pump-out hole of vacuum glass are also provided. The method can seal the pump-out hole reliably and firmly; the sealing structure is stable and has long service life; the welding between the sealing element and the metal layer can be completed instantly and the properties of the glass materials will not be affected.

11 Claims, 4 Drawing Sheets

Heater

METHOD FOR SEALING PUMP-OUT HOLE OF VACUUM GLASS, SEALING STRUCTURE AND SEALING DEVICE

TECHNICAL FIELD

The present invention relates to a method for sealing the pump-out hole of a vacuum glass, a sealing structure and a device for sealing the pump-out hole.

BACKGROUND ART

The existing vacuum glass is roughly divided into two kinds according to different modes of forming vacuum: the first one, compounding of two glass plates and sealing of peripheries of the two glass plates are both performed in a vacuum chamber, and vacuum is naturally formed in the sealed gap between the two glass plates after sealing; and the second one, the two glass plates are first compounded, then the peripheries of the glass plates are sealed, then the sealed gap between the glass plates is vacuumized through a pump-out hole preformed on one glass plate, and the pump-out hole is sealed after pumping, thus completing making of the vacuum glass. For the second vacuum glass, sealing of the pump-out hole is a last step for making the vacuum glass, and whether the pump-out hole is sealed reliably and whether the sealing structure is compact and firm are directly related to the quality of the vacuum glass, related to whether the later use of the vacuum glass is convenient and related to whether the vacuum glass is attractive, so the sealing of the pump-out hole of the vacuum glass becomes a crucial step for making the vacuum glass.

INVENTION CONTENTS

The present invention aims to provide a novel method for sealing the pump-out hole of a vacuum glass, a sealing structure formed by using the method and a device for sealing the pump-out hole.

The method for sealing the pump-out hole of the vacuum glass comprises the following steps:
1) Preparing a metal layer bonded with a glass plate around the pump-out hole on the outside surface connected with a pumping device on the glass plate; and
2) Air-tightly welding a sealing element and the metal layer around the pump-out hole by a metal brazing process after pumping.

Further, the metal layer is made of a metal foil suitable for brazing, and the metal foil is welded on the surface of the glass plate through ultrasonic.

Further, the metal layer is a metallized layer formed on the surface of the glass plate by sintering, and the preparation steps of the metallized layer comprise:
1-1) Preparing a metal paste coating on the outside surface of the glass plate; and
1-2) Heating the glass plate to sinter the metal paste coating into the metallized layer bonded with the glass plate.

Further, the metal paste coating is prepared on the surface of the glass plate in a manner of dip coating, spray coating, screen printing, manual coating or mechanical coating.

Further, the whole sealing element is made of a metal material suitable for brazing.

Further, the sealing element takes glass as a matrix, and the metallized layer is prepared on the surface of the glass.

Further, the metal layer or the metallized layer is in a shape of ring concentric with the pump-out hole, and the sealing element is in a shape of circle matched with the metal layer or the metallized layer.

Further, the sealing element is provided with a circular boss, and the sealing element is positioned on the pump-out hole by inserting the boss into the pump-out hole.

Further, a counter bore concentric with the pump-out hole is formed on the outside surface connected with the pumping device on the glass plate. The metallized layer is prepared at the bottom of the counter bore, and the sealing element is positioned in the counter bore.

Further, a counter bore concentric with the pump-out hole is formed on the inside surface opposite to the pumping device on the glass plate. The metallized layer is prepared at the bottom of the counter bore, and the sealing element is positioned in the counter bore.

A sealing structure for the pump-out hole of a vacuum glass consists of a sealing element and a metal layer prepared around the pump-out hole on a glass plate and bonded with the glass plate, wherein the sealing element is covered on the pump-out hole and air-tightly welded with the metal layer by a metal brazing process.

With respect to a device for sealing the pump-out hole of a vacuum glass, a metal layer bonded with a glass plate is arranged around the pump-out hole on the outside surface of the glass plate. A sealing element is covered on the pump-out hole, and a metal brazing material is arranged between the sealing element and the metal layer. The device comprises a pumping cover and a heater. The end of the pumping cover is open, and a sealing ring is arranged on the open edge. The wall of the cover is provided with a connecting port connected with an external pumping device, and a pushing device for pushing the sealing element to keep the sealing element covered on the pump-out hole is arranged in the pumping cover; the heater is used for heating the sealing element, the metal layer and the brazing material after pumping is finished, and the sealing element is air-tightly welded with the metal layer by a metal brazing process.

Further, the pushing device is a pushing spring, and one end of the pushing spring is sleeved on a supporting post arranged in the pumping cover.

According to the present invention, the pump-out hole is covered by using the sealing element, and the sealing element is in welding connection with the metal layer around the pump-out hole by the metal brazing process. Compared with the conventional pump-out hole sealing mode, the present invention has the advantages as follows:
1. The sealing element is in surface connection with the metal layer around the pump-out hole, so the sealing is reliable and the connection is firm.
2. The brazing material is covered between the sealing element and the glass plate, so oxidation is not easily produced, and the stability of the connecting structure is ensured, hence the service life is prolonged.
3. The counter bore is formed at the pump-out hole. The sealing element is embedded into the counter bore and the outer surface of the sealing element is flush with the glass plate, so that not only is consistency of the outside surface of the vacuum glass product kept, but also later carrying and installation of the vacuum glass are facilitated. If a trademark is stuck on the outside surface of the sealing element, the product is attractive and elegant.
4. Because the welding connection between the sealing element and the metal layer can be completed instantly, the performance of a tempered glass or semi-tempered glass material is prevented from being affected by structure change.

DETAILED DESCRIPTION:

The present invention is described in detail by combining the drawings as follows.

Figure 1:
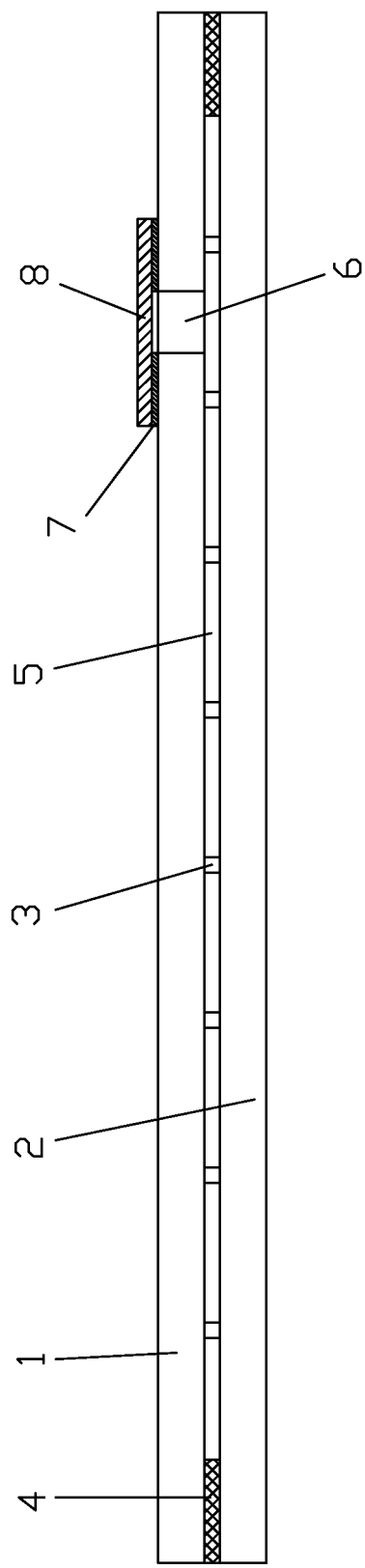
FIG. 1 is a schematic diagram of a sealing structure for the pump-out hole of a vacuum glass of the present invention.
Figure 2:
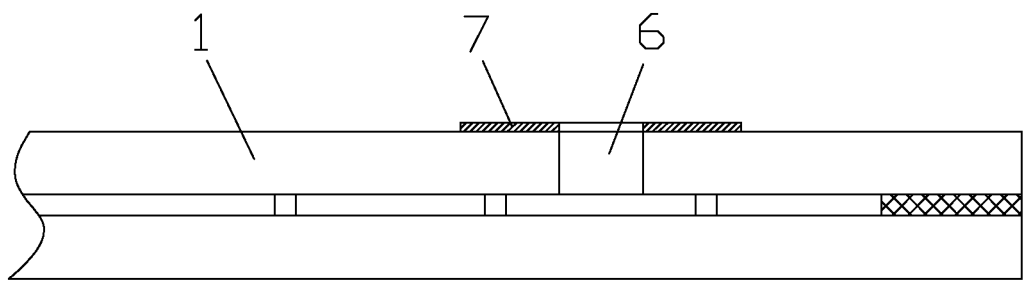
FIG. 2 is a structural schematic diagram of the pump-out hole part on a glass plate.

A method for sealing the pump-out hole of a vacuum glass comprises the following steps: preparing a metal layer 7 bonded with a glass plate 1 around the pump-out hole 6 on the outside surface connected with a pumping device on the glass plate 1, referring to FIG. 2; preparing a sealing element 8 matched with the metal layer 7; and covering the sealing element 8 on the pump-out hole 6 after pumping is finished, and air-tightly welding the sealing element 8 and the metal layer 7 by a metal brazing process to form a sealing structure shown as FIG. 1.

The metal layer 7 can be made of a metal foil suitable for brazing, and is welded on the surface of the glass plate through ultrasonic.

The metal layer 7 can also be a metallized layer sintered on the surface of the glass plate. The metallized layer is prepared by the following steps: preparing a metal paste coating on the surface of the glass plate, and then heating the glass plate to sinter the metal paste coating into the metallized layer bonded with the glass plate, wherein, the metal paste coating can be prepared on the surface of the glass plate in a manner of dip coating, spray coating, screen printing, manual coating or mechanical coating.

The sealing element 8 can be a metal piece made of a metal material suitable for brazing and can also take glass as a matrix, and the metallized layer is prepared on the surface of the glass by the above method.

The sealing element 8 can be placed on the pump-out hole 6 before pumping, and is in brazing connection with the metal layer 7 by heating after pumping is finished; or the sealing element 8 is placed on the pump-out hole 6 after pumping is finished and in brazing connection with the metal layer 7.

A brazing material between the sealing element 8 and the metal layer 7 can be a brazing material foil in the same shape as the metal layer 7, is placed between the sealing element 8 and the metal layer 7, and can also be pre-plated on the surface of the sealing element 8 or the metal layer 7 before pumping.

The metal layer 7 around the pump-out hole on the glass plate can be in a shape of ring concentric with the pump-out hole 6, and correspondingly, the sealing element 8 is in a shape of circle matched with the metal layer 7.

Figure 3:
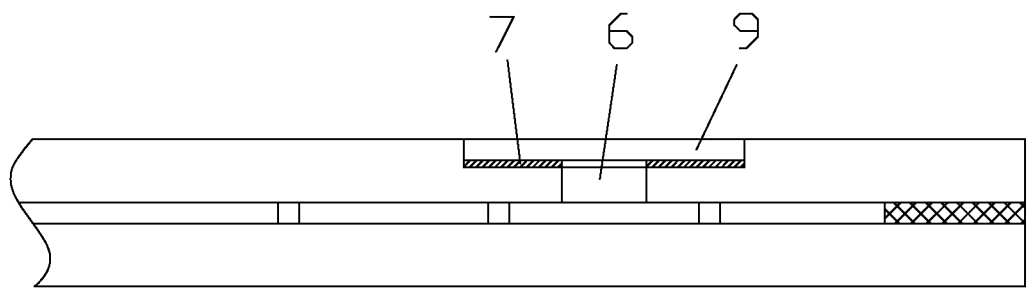
FIG. 3 is a schematic diagram of the other structural form of the pump-out hole.

Shown as FIG. 3, a counter bore 9 concentric with the pump-out hole 6 can also be processed in the glass plate, and a metallized layer is sintered at the bottom of the counter bore; meanwhile, the thickness of the sealing element 8 is adjusted to match the depth of the counter bore 9; and after the sealing element 8 is welded in the counter bore 9, the outside surface of the sealing element 8 can be flush with the surface of the glass plate so as to facilitate later use of the vacuum glass.

Figure 4:
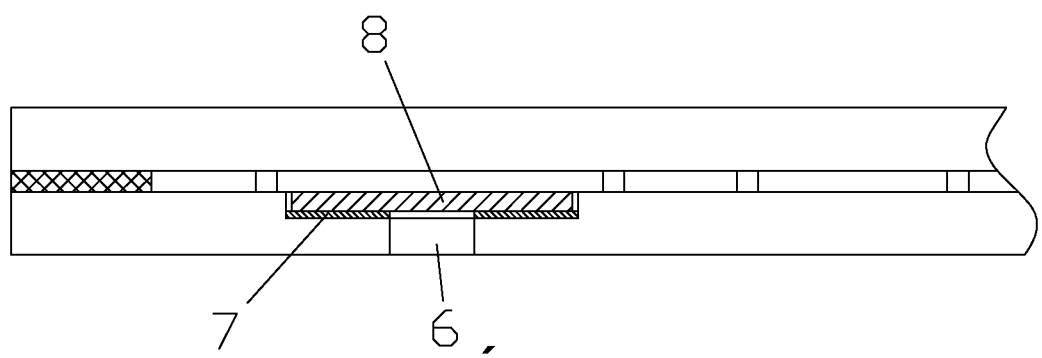
FIG. 4 is a schematic diagram of the second sealing structure for the pump-out hole of the vacuum glass of the present invention.

Shown as the FIG. 4, the sealing element 8 can be used for sealing the pump-out hole 6 on the glass plate from the outside surface of the glass plate and can also be used for sealing the pump-out hole 6 from the inside surface of the glass plate. A counter bore concentric with the pump-out hole 6 is processed on the inside surface of the glass plate. The metallized layer 7 is sintered at the bottom of the counter bore, and the sealing element 8 is positioned in the counter bore. At the moment, the counter bore has the function of holding and positioning the sealing element 8.

Figure 5:
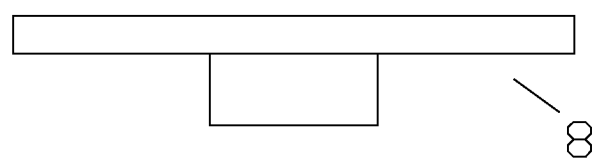
FIG. 5 is a schematic diagram of the second structure of a sealing element 8.

Shown as the FIG. 5, when the pump-out hole is sealed by the sealing element 8, for keeping accurate positioning between the sealing element 8 and the pump-out hole 6, the sealing element 8 can be provided with a circular boss; and by inserting the boss into the pump-out hole 6, positioning between the sealing element 8 and the pump-out hole 6 is realized.

Figure 6:
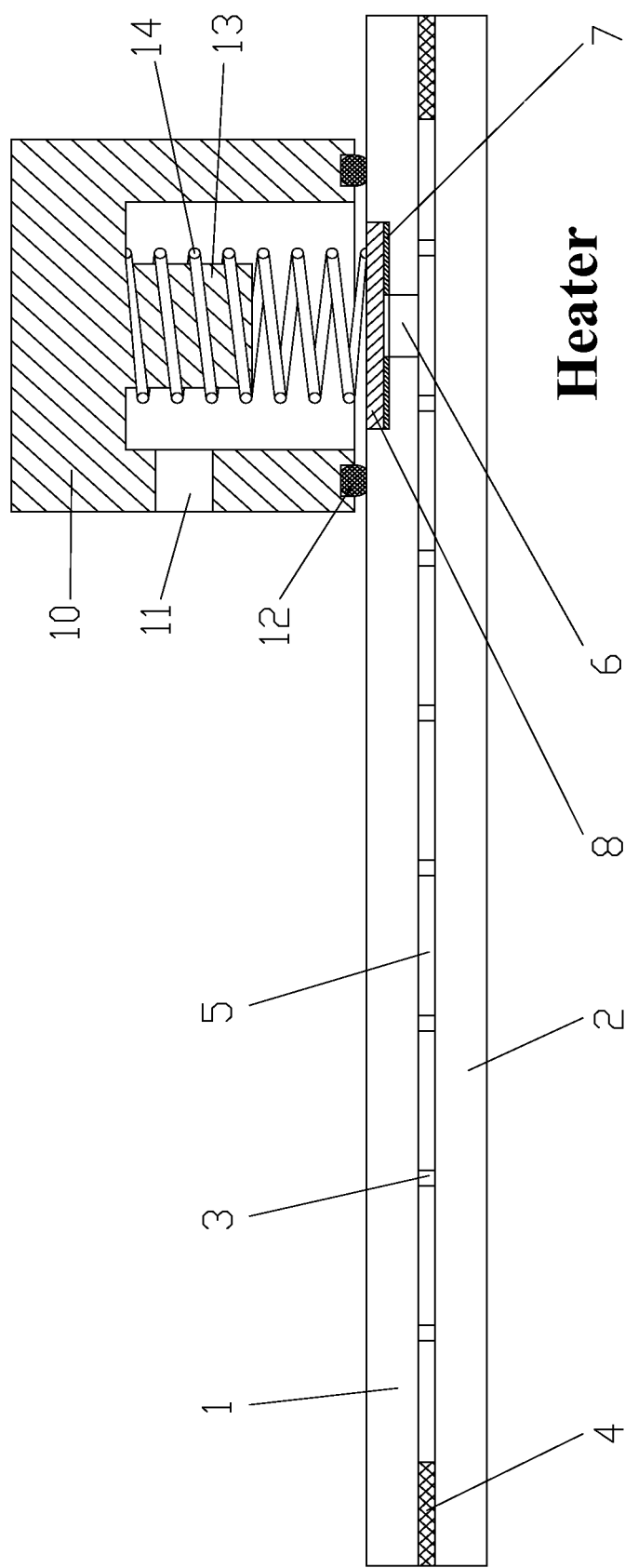
FIG. 6 is a schematic diagram of a working state of a sealing device of the present invention.

FIG. 6 is a schematic diagram when the pump-out hole 6 is sealed by using the device of the present invention.

Shown as the diagram, the sealing device of the present invention comprises a pumping cover 10 and a heater. One end of the pumping cover 10 is open, and a sealing ring 12 is arranged on the open edge. The wall of the cover is provided with a connecting port 11 connected with an external pumping device (not shown in the diagram). A supporting post 13 is arranged in the pumping cover 10, and a pushing spring 14 is sleeved on the supporting post 13.

When the device of the present invention is used, firstly, the sealing element 8 is placed on the pump-out hole 6, and a metal brazing material is placed between the sealing element 8 and the metallized layer 7 at the pump-out hole 6; secondly, the pumping cover 10 is covered on the pump-out hole 6, and the pushing spring 14 is pressed on the sealing element 8; and finally, pumping is performed by using the external pumping device through the connecting port 11 on the pumping cover 10, the sealing element 8, the metallized layer 7 and the brazing material are heated by using the heater after pumping is finished, and the sealing element 8 is air-tightly welded with the metallized layer 7.

The heater can be an induction heating device, a laser heating device, a microwave heating device and other proper heating devices or other heating means can also be adopted for heating.

Figure 7:
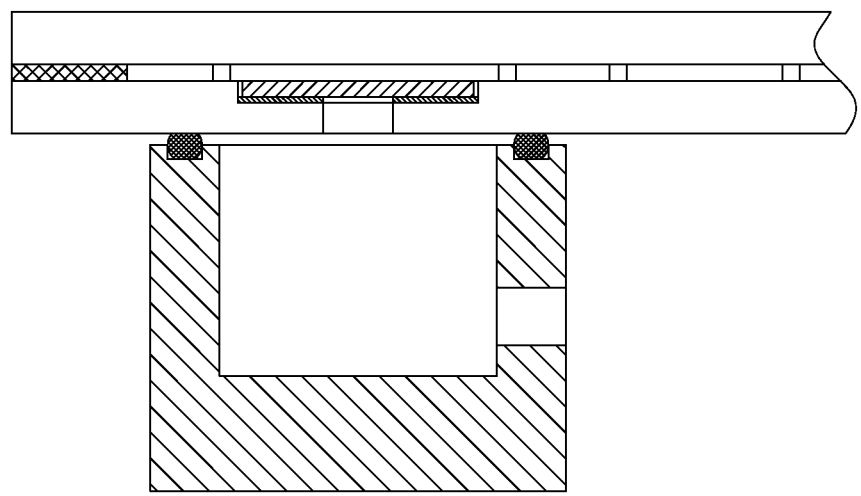
FIG. 7 is a schematic diagram of a working state when the structure shown as FIG. 4 is sealed by using the sealing device.

For the sealing structure for the pump-out hole shown as the FIG. 4, when the pump-out hole 6 is sealed by using the sealing device as FIG. 7, the opening of the pump-out hole should be downward, and the sealing element 8 can be pressed on the brazing material arranged on the surface of the metallized layer 7 by means of self gravity, so that the sealing element 8 and the metallized layer 7 are smoothly welded after pumping is finished.

The above examples are just used for describing the present invention. Embodiments of the present invention shall not be limited to the examples described here, and various specific manners of execution carried out by the skilled person in the art under the condition of perceiving the invention all should be within the extent of protection in the invention.

The invention claimed is:

1. A method for sealing a pump-out hole of vacuum glass, wherein the method comprises the following steps:
    1) preparing a metal layer bonded with a surface of a glass plate around the pump-out hole; and
    2) air-tightly welding a sealing element and the metal layer around the pump-out hole by a metal brazing process after pumping to realize sealing of the pump-out hole;
    wherein a counterbore concentric with the pump-out hole is formed on the surface of the glass plate around the pump-out hole, and wherein the metal layer is prepared at the bottom of the counterbore, and the sealing element is positioned within the counterbore, and wherein a brazing material is inserted between the sealing element and the metal layer for the metal brazing process.

2. The method according to claim 1, wherein the metal layer is made of a metal foil suitable for brazing, and the metal foil is welded on the surface of the glass plate through ultrasonic welding.

3. The method according to claim 1, wherein the metal layer is formed on the surface of the glass plate by sintering, and the preparation steps of the metal layer comprise:
   1-1) preparing a metal paste coating on the surface of the glass plate; and
   1-2) heating the glass plate to sinter the metal paste coating into the metal layer bonded with the glass plate.

4. The method according to claim 3, wherein the metal paste coating is prepared on the surface of the glass plate in a manner of dip coating, spray coating, screen printing, manual coating or mechanical coating.

5. The method according to claim 1, wherein the whole sealing element is made of a metal material suitable for brazing.

6. The method according to claim 1, wherein the sealing element takes a glass as a matrix.

7. The method according to claim 1, wherein the metal layer is in a shape of a ring concentric with the pump-out hole, and the sealing element is in a shape of circle matched with the metal layer.

8. The method according to claim 7, wherein the sealing element is provided with a circular boss, and the sealing element is positioned on the pump-out hole by inserting the boss into the pump-out hole.

9. The method according to claim 1, wherein the counterbore is formed on an outer surface of the glass plate and wherein thickness of the sealing element is matched with the depth of the counter bore, and an outer surface of the welded and fixed sealing element is flush with the outer surface of the glass plate around the pump-out hole.

10. The method of claim 1, wherein the counterbore is formed on an outer surface of the glass plate and wherein the outer surface of the glass plate is configured to connect to a pumping device.

11. The method of claim 1, wherein the counterbore is formed on an inner surface of the glass plate and wherein the inner surface of the glass plate is opposite to an outer surface of the glass plate that is configured to connect to a pumping device.

* * * * *